United States Patent Office 2,954,993
Patented Oct. 4, 1960

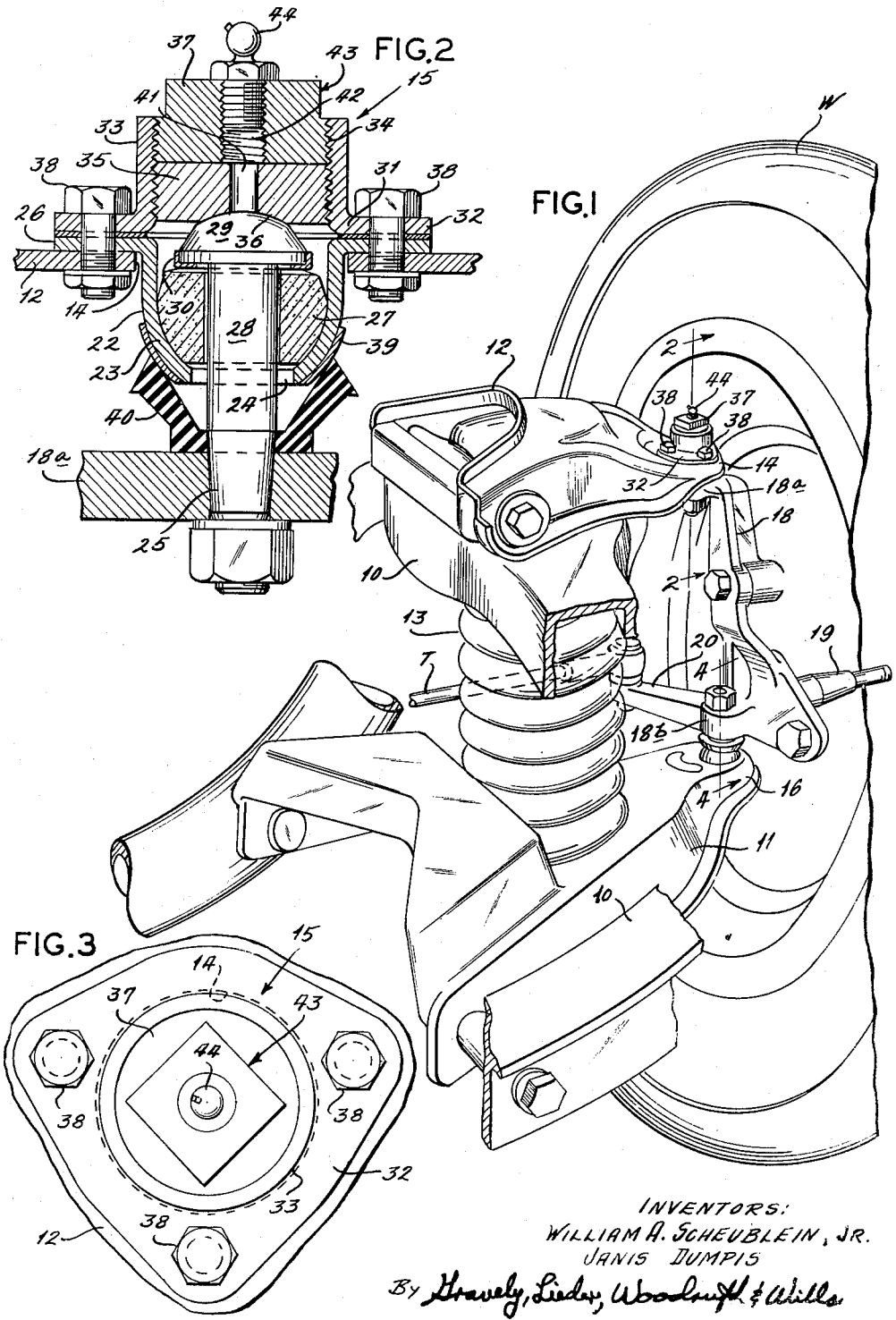

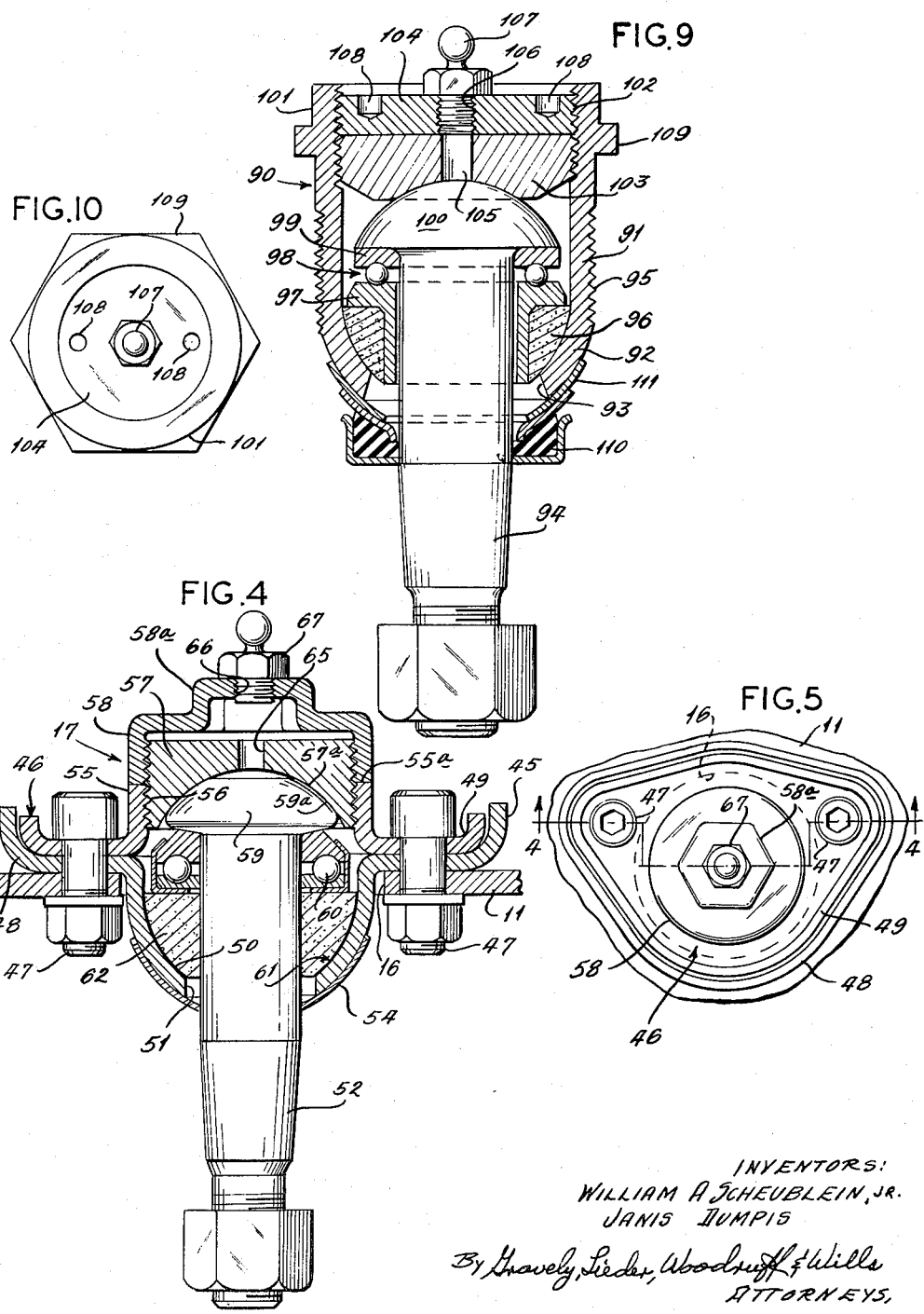

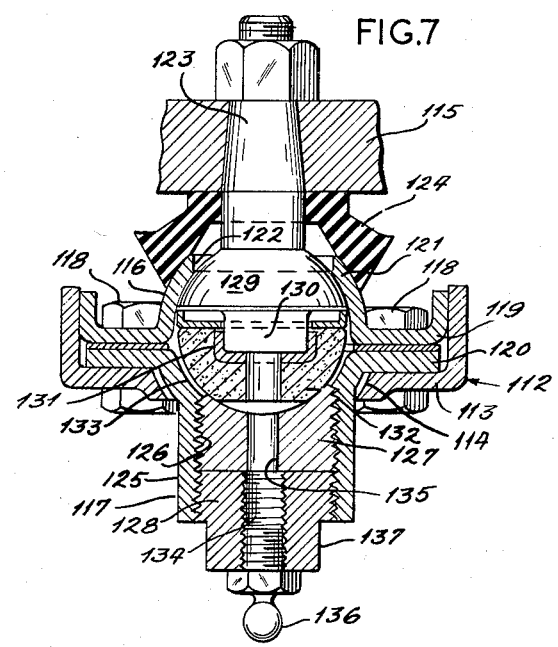
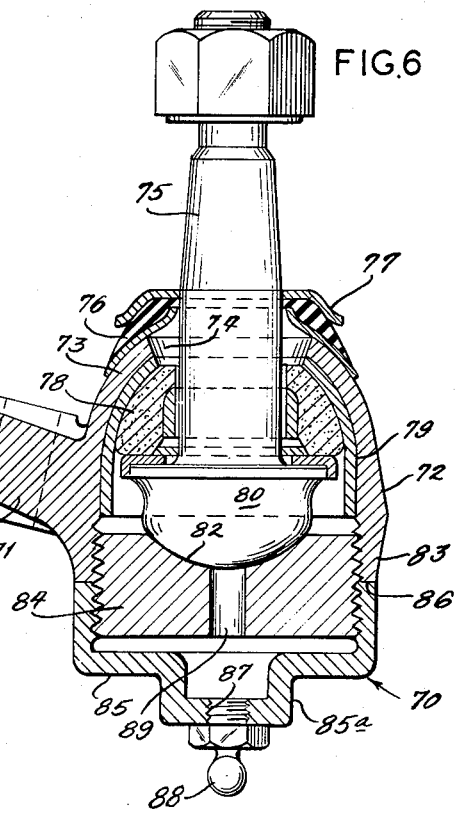
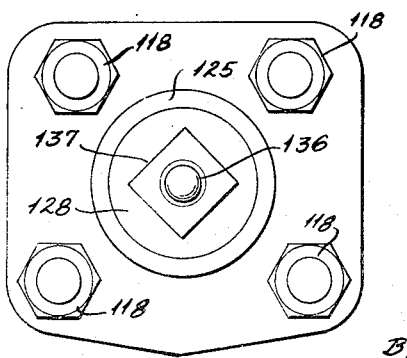
INVENTORS:
WILLIAM A SCHEUBLEIN, JR.
JANIS DUMPIS
BY Gravely, Lieder, Woodruff & Wills
ATTORNEYS.

2,954,993

BALL JOINT ASSEMBLY

William A. Scheublein, Jr., St. Louis, and Janis Dumpis, Overland, Mo., assignors to Moog Industries, Inc., St. Louis, Mo., a corporation of Missouri Filed Nov. 4, 1957, Ser. No. 694,287

7 Claims. (Cl. 287—90)

This invention relates to improvements in ball joint type assemblies for vehicles.

A problem in the use of ball joints for vehicles is in keeping the joint tight enough to prevent chatter and wheel vibration, but allowing it to have freedom to turn and pivot, and also in making adjustments to compensate for wear. Heretofore, it has been proposed to employ coil springs or equivalent means in ball joints to constantly press a wear block on the ball element, thereby automatically taking up wear. This may be advantageous for certain systems, but it has definite hazards in use. A vehicle front wheel ball joint system has its upper and lower arms connected with the wheel spindle, and the main coil spring bears between the lower arm and the frame so that the ball joint connection may normally be loaded either in tension or compression. Excessive oscillation of the main coil spring is taken out by the usual shock absorber which tend to hold the arms in a given position relative to the frame and check the main spring action.

If a vehicle travels at high speed, the air loads tend to lift the front end so that less load is carried by the wheels. This unloading of the wheels reduces the loading in the ball joints. If the joints are worn or loose, the parts tend to chatter as the wheels pass over surface depressions and the like in the pavement. The chatter may be reduced by spring take-up devices such as are shown in Danver Patent No. 1,116,571, dated November 10, 1914, Schultz Patent No. 1,451,964, dated April 17, 1923, and Garman Patent No. 1,458,332, dated June 12, 1923, but it is not entirely corrected. That is to say, the wheel suspension system is not held tight by the anti-chatter springs, and the looseness is carried back to the steering wheel where the driver can sense by touch the critical state of the wheel joints. The looseness in the joints is not overcome by such take-up spring devices as are shown in the foregoing expired patents, and can never overcome it because the springs are not powerful enough to handle the wheel mass at high speed. Also, the friction created by these small springs is not enough to prevent the wheel mass from causing oscillations in the main springs. A large force may be built up in the wheel suspension system as a vehicle moves at high speed over a rough surface, and dangerous instability conditions appear, such as wandering, failure of the steering to respond under side wind loads, and vibration caused by the unloading of the suspension system which leaves the wheels free to dance on the pavement at a high frequency rate.

The foregoing defects are reduced to a safe condition by maintaining the ball joint assemblies tight so that the wheel suspension system will respond to the checking action of the shock absorbers which are designed to be powerful enough to stabilize the main springs. Furthermore, the tightness in the ball joints prevents the attainment of conditions where the loading forces in the ball joints tend to reverse, thereby eliminating the loose wheel action described above. It is also pointed out that looseness in the wheel action can arise from excessive build-up of manufacturing tolerances in the parts of the ball joints. This latter defect is present in most of the current ball joint assemblies, whereas the present improvement aims to provide adjustment to correct this fault.

A principal object of this invention is to provide a ball joint assembly which incorporates novel means to permit positive, non-resilient, adjustment of certain parts whereby looseness and wear may be corrected in a simple and easy manner.

It is an object also to provide a ball joint assembly with relatively movable parts in an accessible location to permit adjustments to be made with the assembly installed in running position, and to allow correction of tolerance build-up.

A further object of the invention is embodied in the construction of certain parts of the ball joint in a more economical manner and with better use of material so that a less expensive assembly will result.

Still another object of the invention is seen to reside in the design of the parts of a ball joint assembly to provide more economical manufacture through the forming of the parts by stamping, drawing, or forging, and by automatic screw machine methods.

The present invention, when broadly considered, consists in a body structure which may be formed of one piece or of several pieces, bearing members in the body arranged so that one of the members forms the usual stud for connection to the wheel suspension system, and infinitely adjustable means carried by the body to exert a thrust on the members within the body to take out looseness and to correct for manufacturing tolerance build-up. The invention further consists in certain preferred modifications which are hereinafter described in detail, such modifications embodying the foregoing broad principle of providing infinite adjustment for a ball joint assembly for the purposes already outlined, and to overcome the objectionable adjustment conditions found when employing cotter pin means for fixing an adjustment.

Other objects and advantages of the present invention will be pointed out or will become evident from the following detailed description of certain preferred embodiments, reference being made to the accompanying drawings, wherein:

Fig. 1 is a perspective view of a vehicle suspension system in which the improved ball joint assemblies are shown;

Fig. 2 is a longitudinal sectional elevational view of the upper ball joint assembly seen along line 2—2 of Fig. 1;

Fig. 3 is a top plan view of the assembly seen in Fig. 2;

Fig. 4 is a longitudinal sectional elevational view of the lower ball joint assembly seen along 4—4 of Fig. 1, the view being shown inverted;

Fig. 5 is a top plan view of the assembly seen in Fig. 4;

Fig. 6 is a longitudinal sectional elevational view of a modified lower ball joint assembly constructed by a method differing from that applied to the joint assemblies of Figs. 2 and 4;

Fig. 7 is a further modified ball joint assembly constructed by still another method of manufacture;

Fig. 8 is a top plan view of the assembly seen in Fig. 7.

Fig. 9 is a further modified ball joint assembly constructed in accordance with still another manufacturing method; and Fig. 10 is a top plan view of the assembly shown in Fig. 9.

Referring to Fig. 1, it will be understood by those skilled in this art that the front wheel suspension system shown embodies a chassis or frame part 10 on which are pivotally mounted for vertical movement a lower arm 11 and an upper arm 12. These arms 11 and 12 are spaced apart and the lower arm is adapted to support a coil spring 13 between it and the frame 10. The upper arm is formed with an eye 14 to receive the upper ball joint assembly shown at 15 in Fig. 2, while the lower arm has an eye 16 to mount the ball joint assembly shown at 17 in Fig. 4. These ball joint assemblies 15 and 17 connect a bracket 18 between the arms 11 and 12 for pivoting movement in a substantially horizontal plane so that a wheel W bearinged on the spindle 19 may be turned for steering the vehicle. The steering linkage is not necessary to illustrate, as it forms no part of this invention, but the usual tie rod T is suitably connected to the arm 20. In the suspension system shown the upper ball joint assembly 15 is under tension loading and the lower ball joint assembly 17 is also under tension loading.

In Figs. 2 and 3, the upper ball joint assembly 15 is formed of stampings for rapid and economical manufacture. For example, the body of the joint is formed in two parts, wherein the socket 22 has a semi-spherical seat end 23 which is open at aperture 24 to permit the stud 25 to extend outwardly to be received in the upper eye 18a of the bracket 18. The socket is formed with a mounting flange 26 which engages the upper arm 12 at the eye 14. The body provides an interior space for a sintered bearing member 27 which is seated in the end 23 of the socket 22 surrounding the shank 28 of stem 25, and a head member 29 on the stud 25 bears upon the bearing member 27 through a wear ring 30. The socket 22 cooperates with the second part of the body in the form of a cap 31 which is stamped from sheet metal to provide an attachment flange 32 which mates with the flange 26 of the socket. Cap 31 of the body is formed with a tubular extension 33 having its bore internally threaded as at 34. The extension houses an adjustment element 35 which is threaded into the extension and engages upon the semi-spherical surface of the head member 29, the element 35 also having a spherical seat surface 36 to permit rocking motion of the head 29 relative thereto. The element 35 is recessed in the extension so that a jam nut 37 may be threaded into the extension 33 to lock the element in adjusted position.

Suitable attachment elements 38 are utilized to connect the body of the ball joint assembly upon the upper arm 12 in the eye 14 thereof. Rocking movement of the stud 25 in the socket 22 is permitted by forming the aperture 24 larger than the stud 25, and the space thus formed is closed by a dust cover composed of a wear ring 39 on the socket and a flexible boot 40 carried by the stud to slide relative to the ring 39 in the usual manner.

The feature of improvement in this ball joint assembly, besides the fact that it incorporates stampings for the socket 22 and cap 31, resides in the locking adjustment of the element 35 and jam nut 37, whereby endwise looseness in the stud 25 may be easily and quickly corrected, and manufacturing tolerance may be taken out. To this end, the element 35 is formed with socket 41 to receive a suitable tool, such as an Allen wrench, and the nut 37 is provided with an enlarged access aperture or bore 42 in axial alignment with the wrench socket 41. The outer end 43 of the nut 37 may be square, as in Fig. 3, or it may be hexagonal or octagonal to receive a suitable tool for threading the nut into or out of the extension 33. Furthermore, the aligned socket 41 in element 35 and the bore 42 in nut 37 provide a passage for feeding lubricant onto the head 29 of the stud 25 where it may spread over the internal bearing surfaces of the assembly. A lubricant fitting 44 of suitable type is threadedly mounted in the outer end of bore 42 in the nut 37.

Adjustment of the assembly is accomplished by removing the fitting 44 to open the passage for passing an Allen wrench into the socket 41 in element 35. Another tool is applied to the nut end 43 and back the nut 37 away from the element 35 until the element is free to be turned up to take out endwise looseness of the stud 25. After the correct adjustment has been attained, the element 35 is held by the Allen wrench while the nut 37 is again tightened up to retain the element 35 in the desired position. Following this adjustment the fitting 44 is replaced in bore 42.

In Figs. 4 and 5, there is illustrated a lower ball joint assembly 17 wherein the hollow body is made up of a socket 45 and cap 46 which are stamped parts connected by suitable elements 47 through the respective flanges 48 and 49. The flange 48 is seated against the lower arm 11 at the eye 16 therein. The socket 45 is formed with a semi-spherical seat 50 which is open at 51 to permit the stud 52 to project outwardly to connect with the eye 18b of the spindle bracket 18 under tension loading. A suitable flexible dust cover or boot 54 surrounds the stud 52 at the opening 51 and slides upon the outer surface of the seat end 50 of socket 45. The cap 46 is formed with an extension 55 having its bore threaded at 56 to receive an adjustment element 57 threaded therein, and a jam nut 58 is threaded upon the element 57. Stud 52 is formed with a head member 59 having a spherical surface 59a mating with a similar surface 57a of the adjustment element 57 for rocking movement. The stud head member 59 is also engaged with an anti-friction bearing 60 which, in turn, is supported on a sintered bearing member 62. The member 62 is mounted in the seat 50 upon a spherical surface 61 which slides over the seat 50. Thus the space within the hollow body of the joint contains the bearing member 62 and head member 59 which work on the surfaces provided for such purpose.

The assembly 17 of Figs. 4 and 5 is adjusted after the manner described for the assembly 15 in Fig. 2, that is, the element 57 is provided with an Allen wrench socket 65 and the jam nut 58 has an axially aligned bore 66 to permit access to the wrench socket 65, and to provide a passage for lubricant to the interior of the assembly from the lubricant fitting 67 threaded into the bore 66. A wrench head 58a on the nut 58 allows turning of this part relative to element 57 for adjusting endwise looseness and wear of the stud 52 and bearing member 62. The nut 58 is adapted to abut the end face 55a of the socket extension 55 to retain the adjustment element 57 in position.

The modified ball joint assembly 70 shown in Fig. 6 embodies a one-piece forged body 71 having an interior space defined, in part, by a socket 72 formed with a conical seat portion 73 open at its end 74 to permit outward passage of a stud 75 for connection to a bracket eye, such as eye 18b in bracket 18, of a suspension system. A suitable flexible dust cover 76 slides on the outer surface of the end 73 of the socket body 72 and is retained on the stud 75 by a cup-like retainer member 77. The socket 72 carries a sintered bearing member 78 and a wear piece or liner 79, while a head member 80 on the stud 75 bears upon the bearing member 78 through a wear ring 81. The semi-spherical surface 82 of the head member 80 extends into the socket extension 83 and is engaged by an adjustable element 84 which is threaded into the extension 83, as shown. Element 84 projects normally from the extension 83 to receive a threaded jam nut and cap member 85, the nut engaging the outer end 86 of the extension 83 to retain the element in adjusted position. Nut 85 is provided with a wrench head 85a, similar to that shown in Fig. 4, the head having an aperture 87 to receive a threaded lubricant fitting 88. The aperture 87 is in axial alignment with an Allen wrench socket 89 in the element 84 so that relative turning adjustment of the element 84 to correct the endwise looseness and wear in the assembly may be had. This adjustment is carried out in the manner previously described in connection with the assemblies of Figs. 2 and 4.

In Figs. 7 and 8 there is shown a ball joint assembly 112 of modified construction which may be used for the lower arm of a suspension system in which the loading in the joint is in compression. The lower arm 113 has an eye 114 to receive the assembly 112, and the wheel spindle bracket has its eye 115 above the lower arm eye 114. The assembly 112 has a body made up of a socket 116 and a cap 117 formed of stamped parts connected together and to the arm 113 by suitable elements 118 at the respective flanges 119 and 120. The body space is formed with a semi-spherical seat end 121 in the socket 116 which is open at 122 to permit the stud 123 to project outwardly to connect with the eye 115 of the spindle bracket under compression loading. A suitable flexible boot 124 surrounds the stud 123 and slides upon the outer surface of the seat end 121 of the socket 116. The cap 117 of the body is formed with an extension 125 having its bore threaded, as at 126, to receive an adjustment element 127 and a jam nut 128 therein. Stud 123 is formed with a head member 129 having a semi-spherical surface mating with the surface in the seat end 121 so that the stud 123 may rock thereon. Also, the head member 129 is formed with an extension 130 to receive a wear cap 131 which, in turn, is disposed in abutment with a sintered bearing member 132. As shown in Fig. 7, the member 132 is mounted in the cap 117 to abut a spherically surfaced, annular wall 133 formed between the flange 120 and the cap extension 125. The compression loading in this assembly is transmitted through the stud 123 to the member 132, to the cap wall 133, and thence to the arm 113 at the eye 114.

The assembly 112 of Fig. 7 is adjusted after the manner described for the assembly 15 in Fig. 2. For example, the jam nut 128 is formed with an excess opening 134 which is axially aligned with a wrench socket 135 in the adjustment element 127. The passage formed by the opening 134 and socket 135 constitute a lubricant bore opening to the interior of the assembly. A suitable lubricant fitting 136 is threaded into the outer end of the opening 134 to receive the lubricant. To facilitate adjustment, the jam nut 128 is formed with a wrench head 137. It is noted in connection with this form of the assembly (Fig. 7) that the bore of the cap extension 125 is contracted to a smaller diameter than the largest diameter of the sintered bearing member 132. This provision guards against separation of the parts should the nut 128 and element 127 become excessively loose, or should these parts fall out due to vibration in use.

Turning now to Figs. 9 and 10, the assembly 90 illustrates a ball joint in which certain parts are formed from bar stock and are threadedly mounted in an arm of a suspension system. For example, the one-piece body 91 has a tapered cylindrical seat end 92 which is open at 93 to permit outward extension of the stud 94 for connection to an eye, such as eye 18b of a bracket 18 in the suspension system of a vehicle. The body 91 is externally threaded at 95 to connect to an arm, such as arm 14, of the system. A sintered bearing member 96 is seated in the end 92 of the body 91 and carries one race 97 of an anti-friction bearing 98, the companion race 99 of this bearing abuts the head member 100 of the stud 94. Body extension 101 is internally threaded at 102 to receive an adjustment element 103 and a jam nut 104. The element 103 is formed with an Allen wrench socket 105, and the nut 104 has an axially aligned threaded bore 106 to receive a lubricant fitting 107. Adjustment of the nut 104 is accomplished by means of a spanner wrench which engages (Fig. 10) in a pair of diametrally spaced sockets 108 formed in the outer nut face. A suitable wrench boss 109 is formed on the body extension 101 to permit mounting and removal of the assembly 90 as is appreciated. The open end 93 of the seat 92 is closed by a flexible dust cover 110 attached to the stud 94 and rocking on a wear ring 111 carried by the body 91.

The foregoing description relates to certain preferred forms of the present invention which embody pressed metal construction, turned parts and forgings, all of which are especially economical and result in advantages in manufacture by reducing the need for many machined parts, and which permit on-the-vehicle adjustments to be made. In each form of the invention chosen for illustration the adjustment is simply obtained through an inner adjustment element, sometimes called a thrust block, and an outer jam nut arranged with aligned passageways which, not only supply lubricant to the assembly, but permit suitable tools to be used to reach and turn the inner adjustment element while under the jam nut. Thus the nut is merely loosened a few turns to free the inner element for adjustment. Such adjustment provisions make it highly useful to mechanics who are enabled thereby to overcome manufacturing tolerance build-up in the assembled parts. This later advantage is especially important to the economical use of pressed metal constructions, and the like, since tolerances may vary from part to part during manufacture, and from positive to negative increments in the same assembly. Another advantage of the adjustment herein provided is that mechanics are easily able to obtain accurate caster and camber adjustments, since the assemblies can be maintained without play or looseness.

The features of this invention, and their equivalents, which is desired to cover will be defined by the annexed claims.

What is claimed is:

1. In a ball joint assembly, a body defining an interior space, an extension on said body opening outwardly from said interior space, a stud extending within said body and having a head member in said space, a bearing member in said space engaging said head member, an adjustment element threaded into said body extension and bearing upon one of said members to adjust the engagement of said members, said element having a wrench socket therein, and a jam nut removably engaging said element and said body extension to retain said element in adjusted position, said jam nut having externally exposed tool engaging means and a separate access opening aligned with said wrench socket to permit adjustment of said element independently of said jam nut through said access opening and adjustment of said jam nut independently of said element, and a lubricant fitting received within said access opening for lubricating the ball joint assembly.

2. In a ball joint assembly, a body forming a housing for the ball joint parts, said body having oppositely directed openings, one of which is defined by a body extension having a threaded bore, a stud projecting through the other body opening, a head member carried by said stud in said body, a bearing member in said body engaged by said head member, an adjustable element in the threaded bore of said extension to bear upon one of said members and adjust the bearing pressure between said members, said element being formed with tool engaging means, and a jam nut removably engaging said element and said extension to fix said element in adjusted position, said jam nut having an externally exposed tool engaging means and a separate opening therethrough to provide access to the tool engaging means, whereby said jam nut may be held from threading action during adjustment of said element and said element may be held during threading of said jam nut, and a lubricant fitting received within said access opening for lubricating the ball joint assembly.

3. In a ball joint assembly, a hollow body having a socket end with an opening therethrough and a bearing seat inwardly of said open end, an extension on said body having a threaded bore opening to the hollow interior, at least two engageable bearing members in said hollow body, a first one of said members engaging said bearing seat and the other of said members having a head in bearing engagement on said first member, an element engaged in said threaded extension bore to abut one of said members and adjust out looseness in the engagement of said bearing members, said element having tool engaging means thereon, and a jam nut engaged with said element and said body extension to hold said element in adjusted position, said jam nut having tool engaging means and a separate opening to provide access to said tool engaging means on said element, whereby said element is independently adjustable through said jam nut and may be held during jam nut adjustment, and a lubricant fitting received within said access opening for lubricating the ball joint assembly.

4. In a ball joint assembly for a vehicle wheel suspension system of steerable type, the improvement of a body having a body extension formed with a threaded bore and a stud opening opposed to the extension bore, a stud connected to the steerable suspension system, a head member on said stud in said body, a bearing member in said body engaged between a body wall and said head member to support said stud, an adjustment element mounted in said threaded bore to bear upon one of said members and take out looseness in the engagement of said member, a jam nut releasably abutting upon said adjustment element and engaging said body extension to retain the element in adjustment, and means in the assembly adapted to allow adjustment of said element through said jam nut comprising a wrench socket opening in said element, an access opening in said jam nut to expose said wrench socket, and wrench engaging means on said jam nut whereby said jam nut may be held upon adjustment of said element, and a lubricant fitting received within said access opening for lubricating the ball joint assembly.

5. The ball joint assembly set forth in claim 4, wherein said body extension threaded bore is smaller in diameter than said members, and said body is formed with a spherical surface adjacent said bore to engage the adjacent one of said members and retain the same within said body.

6. The ball joint assembly set forth in claim 4, wherein said jam nut threadedly engages said adjustment element and engages the outer end of said body extension to cover said adjustment element and close the outer end of said body extension, and a dust boot is mounted upon said stud and said body adjacent the stud opening thereof.

7. An adjustment device for use with a ball joint having a socket for receiving and partially enclosing a headed stud having bearing engagement in the socket, said device comprising a member engaged with the socket to cooperate therewith in forming a substantial enclosure for the stud head therein, securing means to hold said member engaged with the socket, an adjustable element carried by said enclosing member in operative position to exert a load upon the stud head and take out looseness in the bearing engagement of the stud head in the socket, and means adapted to engage said adjustable element and said socket enclosing member to retain said element in adjusted position, said element and element retaining means being relatively threadedly movable and said element retaining means abutting said member to jam the threads of said element and prevent release thereof from adjusted position.

References Cited in the file of this patent

UNITED STATES PATENTS

| | | |
|---|---|---|
| 778,821 | Duryea | Dec. 27, 1904 |
| 791,548 | Fischer | June 6, 1905 |
| 1,431,290 | Daggett | Oct. 10, 1922 |
| 1,855,558 | Payne | Apr. 26, 1932 |
| 1,904,126 | Donaldson | Apr. 18, 1933 |
| 2,110,561 | Stephens | Mar. 8, 1938 |
| 2,645,510 | Booth | July 14, 1953 |
| 2,781,500 | Armstrong | Feb. 12, 1957 |
| 2,811,377 | Latzen | Oct. 29, 1957 |

FOREIGN PATENTS

| | | |
|---|---|---|
| 751,210 | Great Britain | June 27, 1956 |